R. B. WHEELAN.
INDICATING ATTACHMENT FOR SOUND RECORDS.
APPLICATION FILED MAR. 4, 1920.
1,398,289.
Patented Nov. 29, 1921.
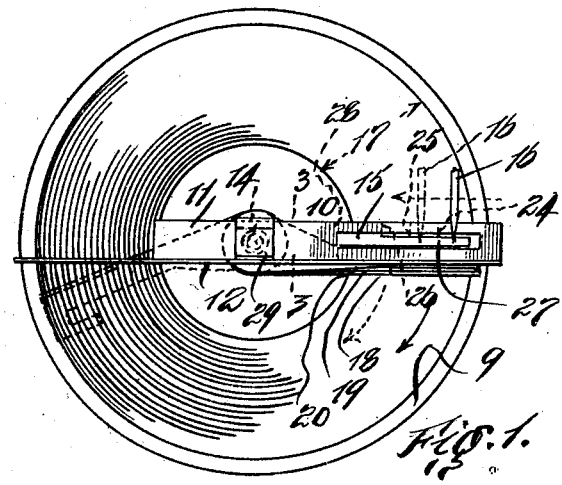
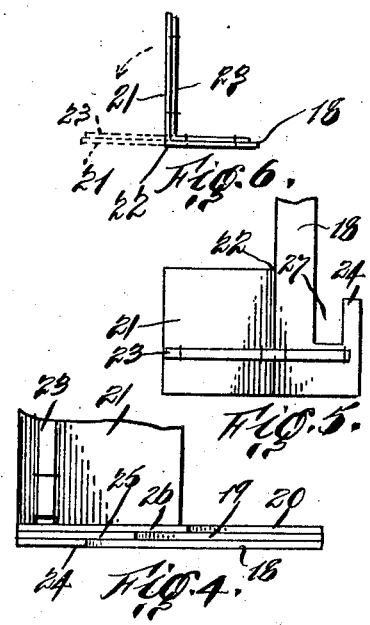
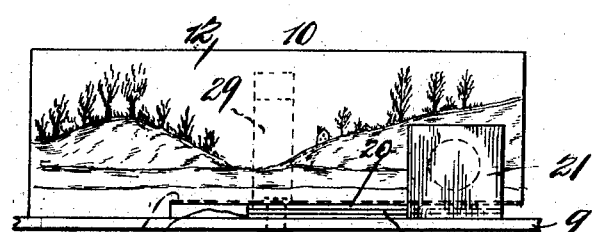
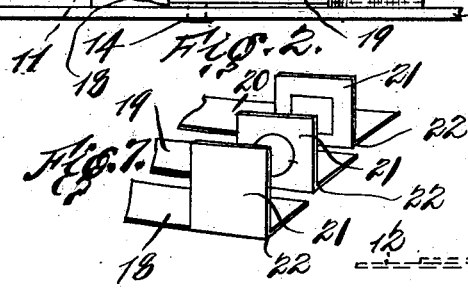
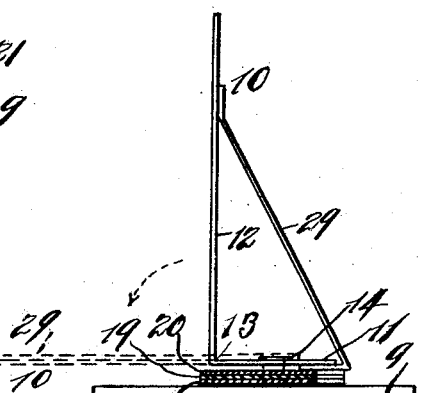
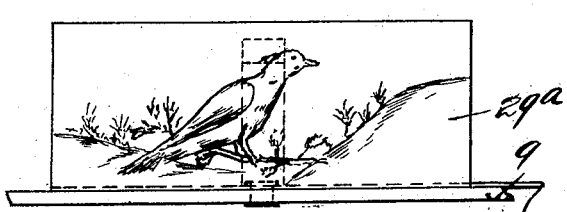
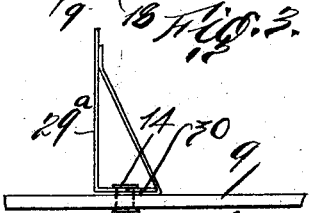
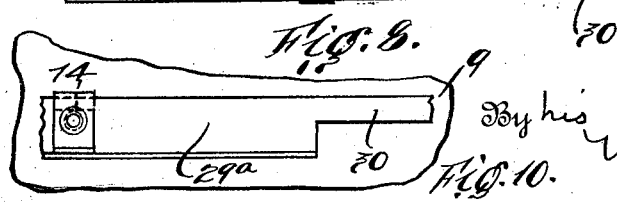
Inventor
Robert B. Wheelan.
By his Attorney

UNITED STATES PATENT OFFICE.

ROBERT B. WHEELAN, OF NEW YORK, N. Y.

INDICATING ATTACHMENT FOR SOUND-RECORDS.

1,398,289.    Specification of Letters Patent.    Patented Nov. 29, 1921.

Application filed March 4, 1920. Serial No. 363,208.

*To all whom it may concern:*

Be it known that I, ROBERT B. WHEELAN, a citizen of the United States of America, residing at New York city, county and State of New York, have invented certain new and useful Improvements in Indicating Attachments for Sound-Records, of which the following is a full, clear, and exact description.

This invention relates to improvements in indicating or illustrating devices for sound records, one of the objects being to provide means to illustrate a sound reproduction or portions thereof, that is to say, to indicate visually the matter which is being played on the record.

To carry out my improvement, I provide a sound record, such as is used in combination with phonographs or the like, with a device having illustrations to correspond with a musical reproduction, monologue or the like. My improved illustrating device comprises a plurality of independently movable elements, each of which is provided with a pictorial illustration to correspond with various portions of the record carrying the device, each element being arranged to move into view while that portion of the record corresponding with the illustration is being reproduced. For example, a record of the song notes of different birds will be provided with illustrating means made up of a plurality of carriers, each having an illustration of the birds, the songs of which make up the record. As the song of each bird is reproduced a correspondent illustration will move into view. This device affords amusement for young or old people. Reproductions of poems can be illustrated by my improved device, likewise monologues or musical compositions, in fact, anything which is being played or reproduced on the sound record can be visually illustrated by means of my device. My invention is arranged so that the illustrations can be seen by those sitting remote from the reproducing instrument, as it is arranged to be vertically positioned while in use, and horizontally positioned when not in use or packed.

In the accompanying drawing, forming part of this specification,

Figure 1 is a top plan view of my device applied to a record;

Fig. 2 is a face view thereof;

Fig. 3 is an enlarged cross sectional view, the section being taken on a line 3—3 in Fig. 1;

Fig. 4 is an enlarged fragmentary detail view of the movable members while nested;

Fig. 5 is a fragmentary plan view of one of the movable elements, the foldable wing being illustrated in horizontal position or position for packing;

Fig. 6 is an end view of one of the movable elements, the wing being illustrated as positioned for use;

Fig. 7 is a diagrammatic detail view, illustrating the outer end of the movable elements;

Fig. 8 is a face view of a modified form of my invention;

Fig. 9 is an end view thereof; and Fig. 10 is a fragmentary plan view thereof, the record disk being broken away.

In the drawing a record disk is illustrated by 9, said disk having applied thereto an easel member 10 consisting of a horizontally disposed member 11 and member 12, foldably connected thereto at 13, Fig. 3. The horizontally disposed member 11 is pivotally secured to the record by an eyelet 14 (in this instance) and is arranged to remain stationary while the record is rotating. The eyelet 14 of course passes through the disk at its axial point. As can be seen, the horizontal portion or base 11 of the member 10 does not extend the full length of said carrier, but from one end to a point slightly past the center of the record to provide for the application of the eyelet 14, and an opening 15, intermediate the ends of the base portion for the passage therethrough of the reproducing needle 16 (Fig. 1), in order that said needle may contact with the record and at the same time prevent rotation of the carrier. The length of the opening 15 will be somewhat greater than the width of the record portion 17 of the disk; hence the travel of the needle toward the center of the disk will not be interfered with. The base portion of the carrier 10 will be raised somewhat from the disk (see Fig. 3) to permit of the application of a plurality of arms 18, 19 and 20, pivotally retained by the eyelet 14. In this instance three arms are illustrated, but any desired number may be used, the number of arms being dependent upon the nature of the record. Each arm at its outer end carries a pad 21. All but one of the pads 21 will be provided with an illustration, the outer one being blank, that is to say, preferably so, but not necessarily. The pads 21 will be foldably connected to their respective arms at 22 in order that they can be laid flat when not in use or packed. When in use the pads will be positioned vertically. To maintain the pads in a vertical position, as well as to provide the arms with a weighted outer end to facilitate the movement thereof, I secure to the arms and pads a strip 23, preferably of lead, or other material that is pliable. As the strip 23 will be pliable, it can be bent upwardly when the pads are to be used, or downwardly when said pads are to be folded or laid flat. The strips 23 will provide weight enough to bear the outer end of arms downwardly against the disk 9. Each arm is provided with a tongue extending longitudinally thereof, said tongue constituting the outer wall of a slot within which the needle 16 operates. The tongues are of different lengths, the length of the tongues determining the time of operation of the arms. For instance, in this instance arm 18 carries a tongue 24 which is shorter than tongue 25 of arm 19, tongue 25 being shorter than tongue 26 of arm 20. Each tongue forms the outer wall of a slot 27 in each arm, said slot having a channel 28 in communication therewith through which the needle can pass after it clears the tongues. To maintain the easel member 10 in upright position while in use, I provide a brace-member 29 arranged at its lower end to releasably engage the base member 11, by being slipped thereunder. At its upper end the brace 29 is connected to the carrier and will be made of some pliable material that can be caused to lie flat when not in use, as indicated by dotted lines in Fig. 3. When the device is to be used, the carrier or easel member 10 will be positioned as indicated in Fig. 1; in other words, with plate member 12 in vertical position and supported by the brace 29. The arms 18, 19 and 20 will be positioned to cause the slots 27 to aline one with the other and with slot or opening 15 in the base member 11. The needle will now be caused to pass through the alined slots and contact with the record adjacent the periphery of the disk. The arms 18, 19 and 20 will be held against rotation by the needle 16 so long as said needle is engaged by a tongue 24, 25 or 26. When needle 16 clears the shortest tongue 24, as it moves toward the center of the disk, arm 18 will be released and will move with the record to the dotted position indicated in Fig. 1. The arm 18 just released carries the blank pad and would indicate that the portion of the record reproduced by the needle up to the time of release of said arm was not illustrated or required no illustration. As soon as arm 18 is released, pad 21 on arm 19 will appear and said pad will carry an illustration, indicated by the circle in Fig. 7. During the travel of the needle along tongue 25, that is to say, along the part of the tongue remaining after arm 18 was released, a reproduction relating to the illustration on this second named pad 21 will be given forth. As soon as this reproduction has ended the needle will clear tongue 25 and arm 19 will move over to the opposite side of the easel. The pad 21 on arm 20 will now appear, said pad having an illustration, indicated by the square in Fig. 7. The illustration on this last named pad will correspond with that portion of the record included within the scope of the remaining portion of the tongue 26. As can be seen, the tongues overlap, the shortest tongue being on the bottom, the next tongue being longer and the topmost tongue the longest. As the lowermost arm moves away, the next one will contact with the record, and so on until all the arms have been moved from under the easel. The tongues will be moved when released by reason of the fact that they lie upon the rotating record. The easel 10 will be preferably provided with a background illustration, a landscope, for instance, if a record of song birds is used, or a stage setting should the record be such as might require such a background.

Instead of employing an easel and arms, I may, for a cheaper grade of article, employ merely an easel indicated by 29ª in Figs. 7 and 8, said easel having an illustration of a vocal artist, animal or any other desirable pictorial representation of the record combined therewith.

One of the advantages of this device is that the illustrations can be seen and enjoyed by persons sitting around the instrument, and it is not necessary to stand over same. The arms and easel member will be preferably made of paper, celluloid or the like.

In the form of my invention shown in Figs. 8 and 9, I provide the upstanding or easel member with a projection 30 to be engaged by a reproducing needle or other element to prevent rotation of the easel-member, the projection being used in lieu of a slot.

Having described my invention, what I claim and desire to secure by Letters Patent is:

1. In combination with a sound record disk, a plurality of independently movable illustrations mounted upon the disk, means to automatically actuate said illustrations to cause them to disappear from view one by one after that portion of the record relating to the illustration in view has been reproduced.

2. In combination with a sound record disk, a plurality of independently movable illustrations arranged for actuation, one by one, by the record to cause the illustrations to disappear from view one by one, as a predetermined portion of the record has been reproduced.

3. In combination with a sound record disk, a foldable easel member pivotally connected to and in frictional engagement with said disk and arranged to be vertically positioned and non revoluble with the disk at times when in use, said easel member being provided with a pictorial illustration of the record on the disk.

4. In combination with a sound record disk, a plurality of illustrations, each illustration mounted upon the disk and representing a different part of the record, and means to automatically cause said illustrations to be presented to view one by one during the reproduction of that part of the record which they represent, the illustrations not in use being concealed.

5. In combination with a sound record disk, a plurality of superimposed arms pivotally connected to the disk and arranged to contact with said disk, means carried by each arm to engage a reproducing needle, whereby said arms are held stationary, said engaging means being arranged to release said arms one by one as the needle travels from the periphery of the record toward the center thereof, whereby said arms are permitted to move one by one with the disk.

6. In combination with a sound record disk, a plurality of superimposed arms operable by the disk, each arm being provided with a slot for the passage therethrough of a reproducing needle, said slots being in alinement and open at one end for the passage of the needle out of said slots, one wall of each slot consisting of a tongue, said tongues being of different lengths, whereby said arms will be released at different portions of the record, each arm having an illustration to correspond with a certain portion of the record.

7. In combination with a sound record disk, a plurality of superimposed arms pivotally connected to the disk and operable by the disk, each arm being provided with a slot for the passage therethrough of a reproducing needle, said slots being in alinement and open at one end for the passage of the needle out of said slots, one wall of each slot consisting of a tongue, said tongues being of different lengths whereby said arms will be released at different portions of the record, each arm having an illustration to correspond with a certain portion of the record.

8. In combination with a sound record disk, a plurality of superimposed arms pivotally connected to the disk and operable by the disk, each arm being provided with a slot for the passage therethrough of a reproducing needle, said slots being in alinement and open at one end for the passage of the needle out of said slots, one wall of each slot consisting of a tongue, said tongues being of different lengths, whereby said arms will be released at different portions of the record, a foldable pad carried by each arm having an illustration to correspond with a certain portion of the record.

9. In combination with a sound record disk, independently operable means mounted on the record to automatically illustrate different parts of the record while said parts are being reproduced, only that illustration representing the part in course of reproduction being exposed to view.

10. In combination with a sound record disk, a stationary illustrative device associated with said record, and a plurality of independently movable illustrating devices combined with said stationary device, said stationary device and said movable devices normally movable by said record but held by a common member from moving therewith except at predetermined times.

11. In combination with a sound record disk, a stationary illustrative device, a plurality of independently movable illustrating devices combined therewith, and means to automatically actuate the movable devices one by one in predetermined relation to the movement of the record, said stationary device and said movable devices normally movable by said record but held by a common member from moving therewith except at predetermined times.

12. In combination with a sound record disk, a foldable stationary illustrative device, a plurality of foldable independently movable illustrating devices combined therewith, and means to automatically actuate the movable devices one by one upon the movement of the record, said stationary device and said movable devices normally movable by said record but held by a common member from moving therewith except at predetermined times.

13. In an illustrating device for sound records, a foldable flat member adapted to frictionally engage a sound record and to rotate with the record and provided with means for arresting its movement with the record, and means for setting the foldable member at a predetermined position of the fold, the setting means including a reinforcement at the fold with tough pliable material.

14. In combination with a sound record disk, a foldable easel member pivotally connected to said disk, and a brace member secured at one end to said easel member and arranged at the free end, to be inserted between said easel member and the record to maintain said easel member in vertical position while in use, said easel member being provided with means to engage a reproducing needle to prevent rotation of the easel member.

15. In combination with a sound record, a needle, means to illustrate a certain part of said record, and movable means to conceal said illustrating means until the part of the record corresponding with the illustration is reproduced, the movement of the concealing means being controlled by the needle.

16. In combination with a sound record disk, an upstanding illustrative member pivotally connected to and frictionally engaging the same to normally rotate therewith and adapted to automatically remain stationary while the record is revolving.

17. In combination with a sound record disk, an upstanding illustrative member associated therewith, means for rotating the disk, and a projection carried thereby arranged to act as a stop to prevent rotation of the upstanding member upon the rotation of the disk.

18. A sound record and means for illustrating said record mounted co-axial with the record and flexed at a chord of the record, the members normally movable together, and means for arresting the movement of the illustration during the movement of the record.

Signed at New York city, N. Y., this 2 day of March, 1920.

ROBERT B. WHEELAN.

Witnesses:
MAURICE BLOCK,
EDWARD A. JARVIS.